United States Patent
Thorat et al.

(10) Patent No.: US 11,838,197 B2
(45) Date of Patent: Dec. 5, 2023

(54) METHODS AND SYSTEM FOR SECURING A SDN CONTROLLER FROM DENIAL OF SERVICE ATTACK

(71) Applicant: Samsung Electronics Co., Ltd., Suwon-si (KR)

(72) Inventors: Pankaj Bhimrao Thorat, Bangalore (IN); Vivek Soni, Bangalore (IN); Satya Kumar Vankayala, Bangalore (IN); Rajesh Challa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 17/513,123

(22) Filed: Oct. 28, 2021

(65) Prior Publication Data

US 2022/0141118 A1 May 5, 2022

Related U.S. Application Data

(63) Continuation of application No. PCT/KR2021/015156, filed on Oct. 27, 2021.

(30) Foreign Application Priority Data

Oct. 29, 2020 (IN) .............................. 202041047322
Oct. 5, 2021 (IN) ............................. 2020 41047322

(51) Int. Cl.
    *H04L 43/16* (2022.01)
    *H04L 47/2483* (2022.01)
    *H04L 9/40* (2022.01)
(52) U.S. Cl.
    CPC .......... *H04L 43/16* (2013.01); *H04L 47/2483* (2013.01); *H04L 63/1458* (2013.01); *H04L 2463/141* (2013.01)

(58) Field of Classification Search
    CPC ............. H04L 63/1416; H04L 63/1458; H04L 2463/141; H04L 2463/142; H04L 2463/143; H04L 47/2483; H04L 43/16
    See application file for complete search history.

(56) References Cited

U.S. PATENT DOCUMENTS 9,973,529 B1 *   5/2018  Bharrat ............... H04L 63/1416
10,742,682 B2    8/2020  Yu et al.
(Continued)

FOREIGN PATENT DOCUMENTS

CN       106161333 A     11/2016
CN       106657107 A      5/2017
(Continued)

OTHER PUBLICATIONS

OpenFlow Switch Specification, Version 1.5.1, Open Networking Foundation, 2015. (Year: 2015).*
(Continued)

*Primary Examiner* — Kostas J Katsikis
(74) *Attorney, Agent, or Firm* — Jefferson IP Law, LLP (57) ABSTRACT

A Method and a system for securing a SDN controller from denial of service attack are provided. A SDN controller receives, from a networking device, data packets pertaining to a flow in Packet_IN messages, if the flow does not match flow entries in a first flow table of the networking device. A table miss flow entry pertaining to the flow is created in a second flow table of the networking device for sending the Packet_IN. The SDN controller installs a flood prevention flow entry in the second flow table to enable the networking device to drop subsequent data packets pertaining to the flow until the SDN controller installs, in the first flow table, a flow entry matching the flow. The flood prevention flow entry is deleted from the second flow table after the installation of the flow entry matching the flow.

20 Claims, 6 Drawing Sheets

(56) References Cited

U.S. PATENT DOCUMENTS

| | | | |
|---|---|---|---|
| 10,819,659 B2* | 10/2020 | Vaishnavi | H04L 49/30 |
| 2014/0098669 A1* | 4/2014 | Garg | H04L 45/38 |
| | | | 370/235 |
| 2015/0180769 A1* | 6/2015 | Wang | H04L 45/38 |
| | | | 370/236 |
| 2016/0294871 A1 | 10/2016 | Huston, III et al. | |
| 2018/0013787 A1 | 1/2018 | Jiang | |
| 2018/0109557 A1 | 4/2018 | Yoo et al. | |
| 2018/0359279 A1* | 12/2018 | Knight | H04L 63/1458 |
| 2020/0389487 A1* | 12/2020 | Zhauniarovich | H04L 63/1491 |
| 2022/0094625 A1* | 3/2022 | Wu | H04L 69/22 |

FOREIGN PATENT DOCUMENTS

| | | |
|---|---|---|
| EP | 3073700 B1 | 7/2019 |
| KR | 10-2017-0090161 A | 8/2017 |
| KR | 10-2018-0041953 A | 4/2018 |
| KR | 10-2018-0070054 A | 6/2018 |
| KR | 10-2020-0031799 A | 3/2020 |
| KR | 10-2020-0069632 A | 6/2020 |
| KR | 10-2020-0082675 A | 7/2020 |
| KR | 10-2021-0015705 A | 2/2021 |
| KR | 10-2226915 B1 | 3/2021 |

OTHER PUBLICATIONS

Babangida et al., Software Defined Networking Flow Table Management of OpenFlow Switches Performance and Security Challenges: A Survey, Future Internet 2020, 12, 147, MDPI, Aug. 31, 2020, pp. 1-30 [Retrieved on Jan. 13, 2022]. Retrieved from the Internet: <URL: https://www.mdpi.com/1999-5903/12/9/147>.

Muhammad Imran et al., Reducing the effects of DOS attacks in software defined networks using parallel flow Installation, Hum. Cent. Comput. Inf. Sci. 9, 16, May 1, 2019, pp. 1-19 [Retrieved on Jan. 13, 2022]. Retrieved from the Internet: <URL: https://hcisjournal.springeropen.com/track/pdf/10.1186/s13673-019-0176-7.pdf>.

Huseyin Polat et al., Detecting DDOS Attacks in Software-Defined Networks Through Feature Selection Methods and Machine Learning Models, Sustainability 2020, 12(3), 1035, MDPI, Feb. 1, 2020, pp. 1-16 [Retrieved on Jan. 13, 2022]. Retrieved from the Internet: <URL: https://www.mdpi.com/207 1-1050/12/3/1035>.

International Search Report dated Jan. 26, 2022, issued in International Application No. PCT/KR2021/015156.

Kaur Chahal et al., Distributed Denial of Service Attacks: A Threat or Challenge, May 30, 2019.

Indian Office Action dated May 19, 2022, issued in Indian Application No. 202041047322.

* cited by examiner

METHODS AND SYSTEM FOR SECURING A SDN CONTROLLER FROM DENIAL OF SERVICE ATTACK

CROSS-REFERENCE TO RELATED APPLICATION(S)

This application is a continuation application, claiming priority under § 365(c), of an International application No. PCT/KR2021/015156, filed on Oct. 27, 2021, which is based on and claims the benefit of an Indian Provisional patent application number 202041047322, filed on Oct. 29, 2020, in the Indian Intellectual Property Office, and of an Indian Non-Provisional patent application number 202041047322, filed on Oct. 5, 2021, in the Indian Intellectual Property Office, the disclosure of each of which is incorporated by reference herein in its entirety.

TECHNICAL FIELD

The disclosure relates to Software Defined Networking (SDN). More particularly, the disclosure relates to methods and systems for securing a SDN controller from a denial of service attack.

BACKGROUND

Figure 1:
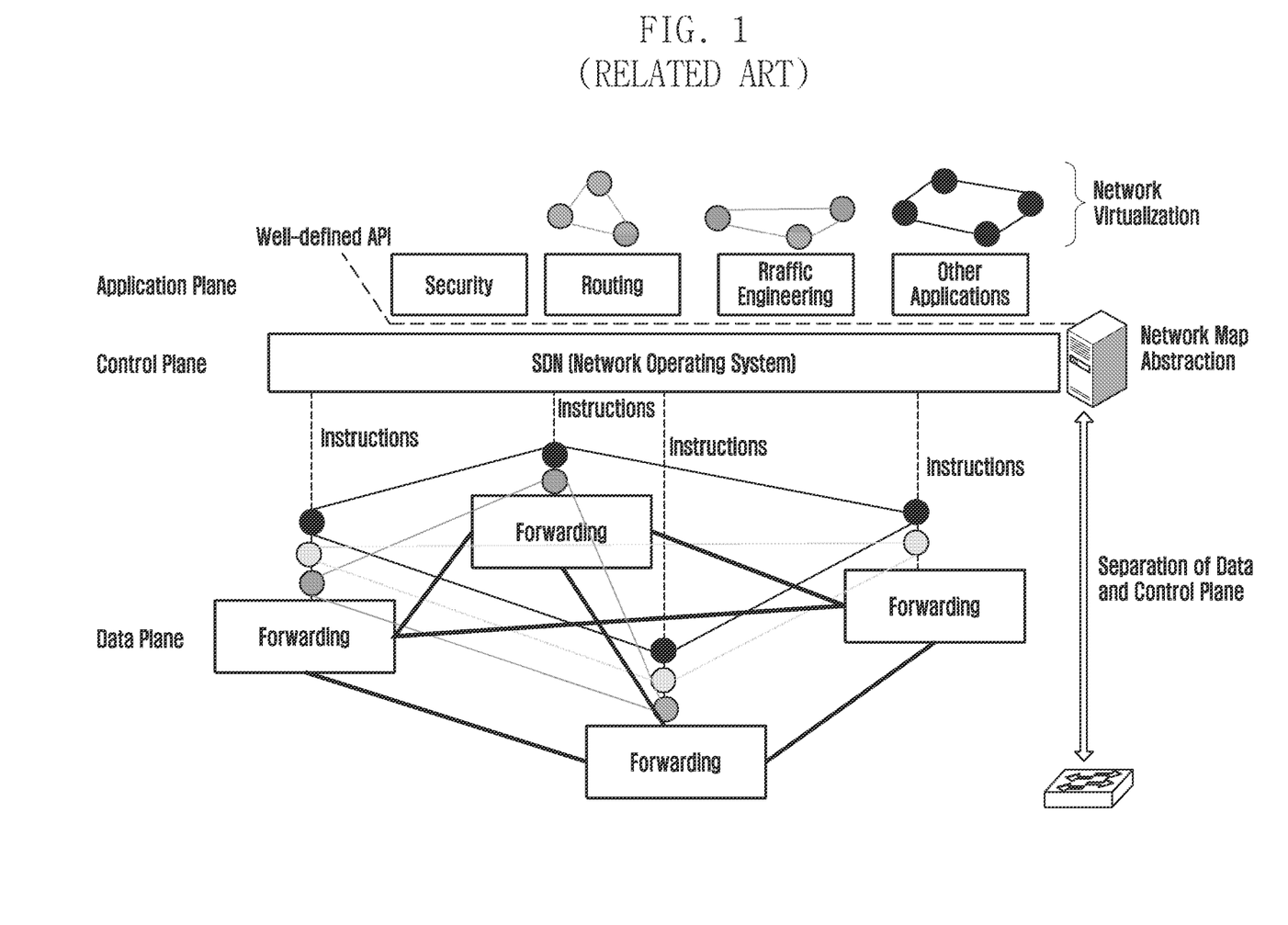
FIG. 1 depicts a Software-Defined Networking (SDN) architecture according to the related art.

Software-Defined Networking (SDN) is one of the main elements of a 5$^{th}$ Generation (5G) network architecture that supports all requirements of a service based architecture. FIG. 1 depicts an SDN architecture according to the related art.

Referring to FIG. 1, in the SDN architecture control plane and data plane are decoupled, network state and intelligence can be logically centralized, and underlying network infrastructure is abstracted from networking applications. In the SDN architecture, the control plane software can be executed on a general purpose hardware, such as commodity servers and switches. The general purpose hardware is decoupled from specific networking hardware.

Figure 2:
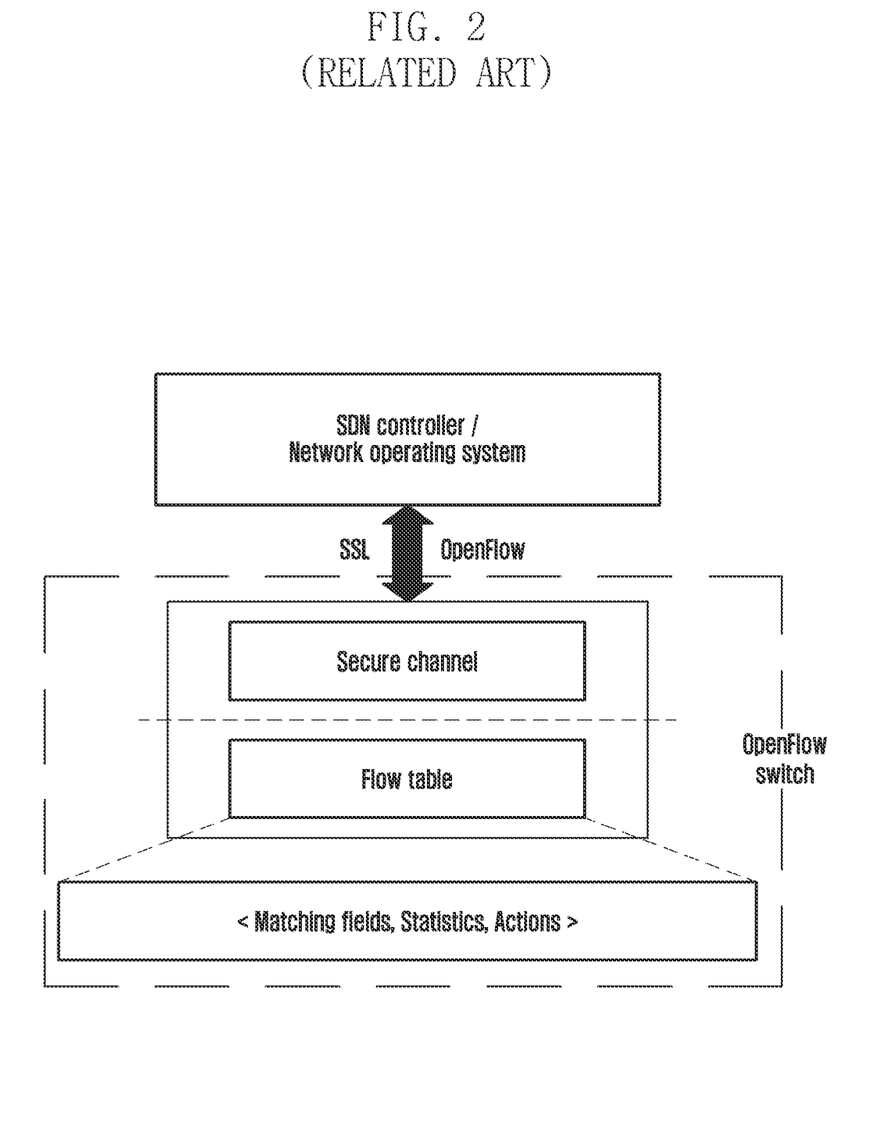
FIG. 2 depicts interaction between a SDN controller and an OpenFlow switch according to the related art.

FIG. 2 depicts interaction between a SDN controller and a switch according to the related art.

Referring to FIG. 2, the switch can be an OpenFlow switch. The SDN controller and the OpenFlow switch can use an OpenFlow protocol for the interaction. The OpenFlow protocol is a protocol used for communication between the control plane and the data plane of the SDN architecture. Referring to FIG. 2, the OpenFlow protocol allows the SDN controller (at the control plane) to directly access and manipulate the forwarding plane of network devices (such as switches and routers), which include physical and virtual devices. The OpenFlow protocol has been designed to manage and direct data traffic amongst the network devices belonging to various vendors.

Figure 3:
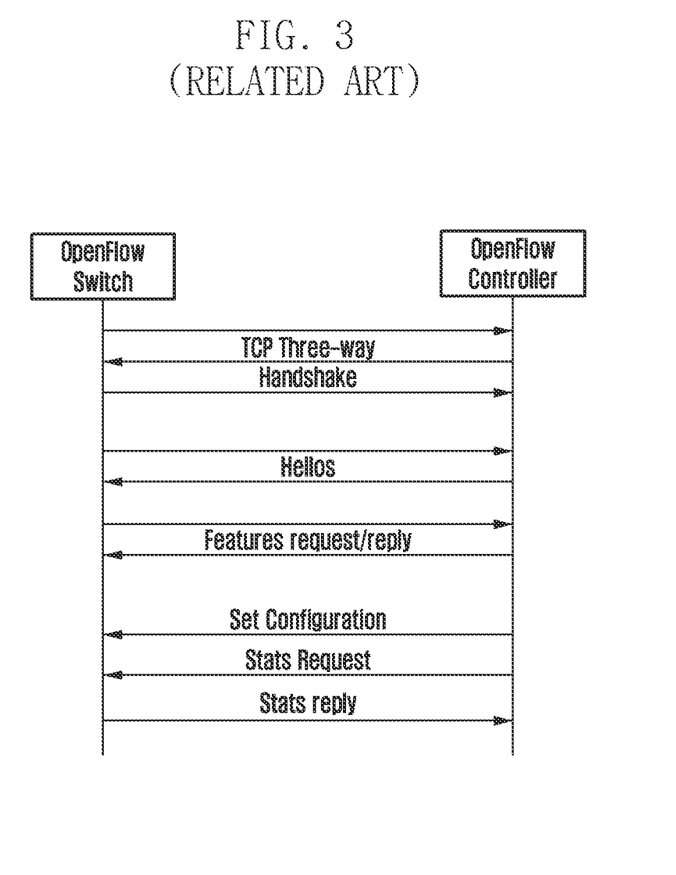
FIG. 3 depicts a flow of information exchanged between the SDN controller and the OpenF low switch to establish a connection according to the related art.

FIG. 3 depicts a flow of information exchanged between the SDN controller and the OpenFlow switch to establish connection according to the related art.

Referring to FIG. 3, the (OpenFlow) switch initiates a standard Transmission Control Protocol (TCP) (or Transport Layer Security (TLS)) connection with the SDN controller. Initially, there is an exchange of TCP handshakes between the SDN controller and the switch. The TCP handshakes are considered successful if the switch and the SDN controller are successfully able to mutually exchange 'Hello' messages and negotiate the OpenFlow protocol version. After the successful exchange of TCP handshakes, a TCP session is established. After establishing the TCP session, the SDN controller sends a feature request message to the switch. The feature request is sent for ascertaining the capabilities of the switch.

The switch responds with a feature reply message, which includes a local Media. Access Control (MAC) address in a virtual switch Data path ID field. After establishing the TCP session, the SDN controller and the virtual switch exchange echo request and reply messages as a keepalive mechanism. A keepalive timer is configured, which is reset if the virtual switch or the SDN controller receives either an echo reply or a packet. Echo requests can be sent every 10 seconds during idle windows, in the absence of other messages. If the virtual switch does not receive the echo reply or any other message from the SDN controller for 120 seconds, the TCP connection is considered lost, and the s virtual witch attempts to re-establish the virtual connection after 10 seconds.

The SDN controller can manage traffic (network flows) by manipulating flow tables at the (OpenFlow) switches, wherein instructions (for the switches) for routing the traffic can be stored in flow tables. In an OpenFlow network, each switch includes at least one flow table and a set of flow entries in each flow table. The flow entries or flow rules include match fields, counters and instructions (actions), to be applied on matched packets. In general, there can be more than a single flow table. Therefore, it may be important to note that matching starts at the and may continue to additional flow tables of a flow table pipeline. The matching between packets and flow tables is initiated start in a first table (table 0 for example), and the header fields of the packets can be matched with the flow entries of table-0 based on priority of the flow entries of table-0. If the header fields of the packets do not match with any of the flow entries of table-0, the matching can continue to other flow tables, as specified in predefined instructions.

Figure 4:
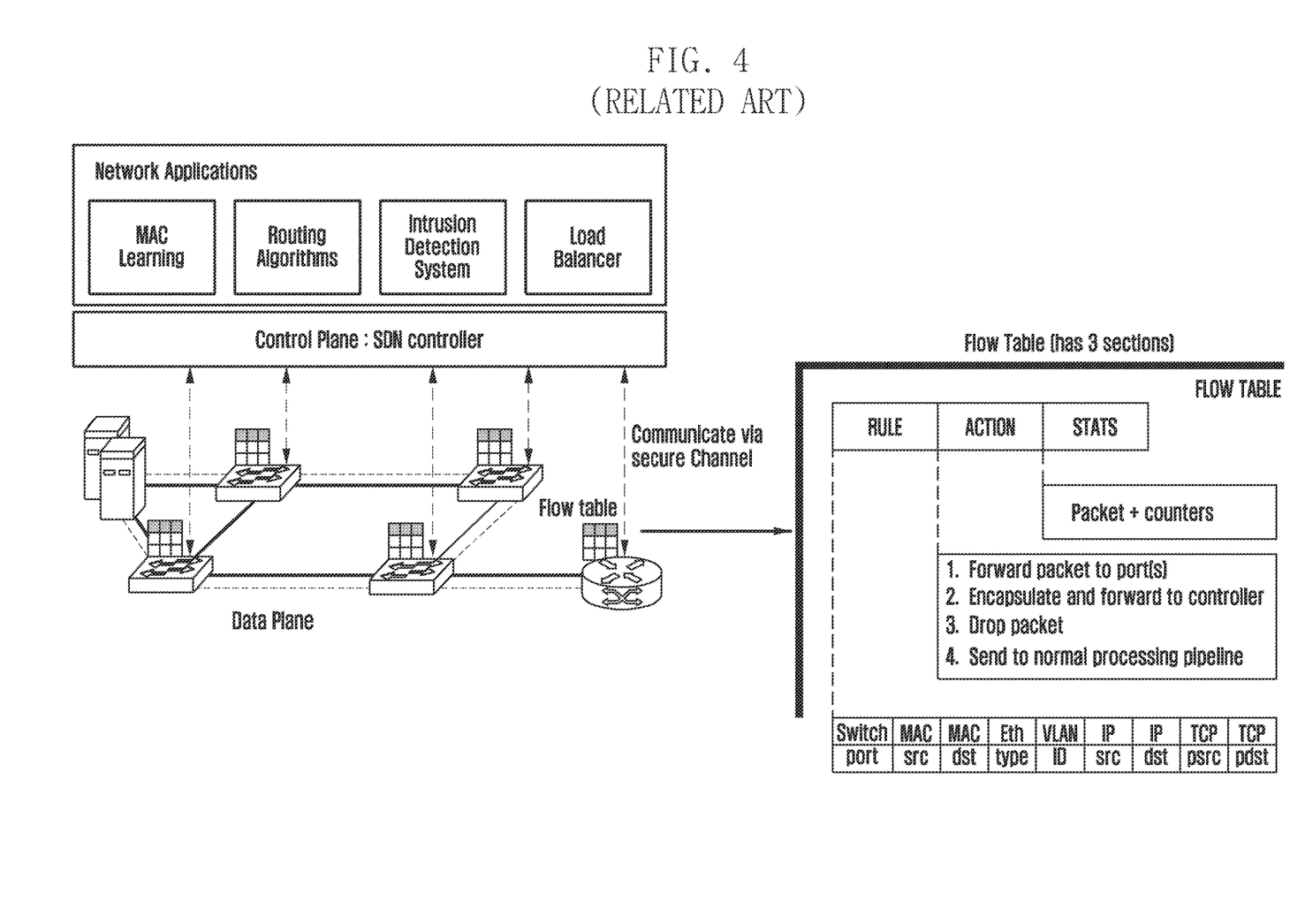
FIG. 4 depicts an example SDN architecture and the sections of flow tables stored in the switches according to the related art.

FIG. 4 depicts an example SDN architecture and the sections of flow tables stored in the switches according to the related art.

Referring to FIG. 4, when a packet arrives at a switch, the header filed of the packet can be matched with flow entries in a flow table in the switch. If a match is found for a particular flow entry in the flow table, actions (preconfigured by the SDN controller) are performed by the switch and counters are updated. If case a match is not found amongst any of the flow entries, the switch can request the SDN controller to send flow rules for routing the packet. The request can be sent by sending a message, which includes the header of the packet.

A flow entry in the flow table comprises matching fields of an incoming packet (for matching with fields such as Ethernet or Internet Protocol (IP) address, User Datagram Protocol (UDP) port or Transport Control Protocol (TCP) port, Virtual Local Area Network Identity (VLAN ID), physical switch port, and so on), an action field (for determining the means to be used for handling an incoming packet), and a packet counter (for monitoring and recording packets belonging to each flow of the traffic). The content in the flow entries of the flow table form the basis of flow rules. For example, if the source address specified in an incoming packet matches a source address in a flow entry, a flow rule would ensure that the incoming packet is routed to a destination address specified in the flow entry. The flow entry in this instance can be referred to as matching flow entry.

A table-miss flow entry may be provided as the last entry in each flow table. The table-miss flow entry is created when header fields of a packet do not match with any matching fields of any flow entry of a flow table. In this instance, the packet can be either forwarded to the SDN controller over a channel (for example: an OpenFlow Channel), dropped, or the matching could continue with the subsequent flow table. If none of the flow tables have any matching flow rule (flow entry) a preconfigured table-miss entry having the lowest priority can be created in one of the flow tables to send the header of the packet to the SDN controller encapsulated in an OpenFlow header of type Packet_IN. The SDN controller finds a path, comprising one or more switches, to route the packet to its destination, based on the header information of the packet and the knowledge of the SDN controller about 5G network topology. In order to setup the path, the SDN controller can configure flow entries in one or more switches in the path. Subsequent packets belonging to the same flow use the flow entries to traverse the path set by the SDN controller.

Until the path is setup, if the sender of the packet (i.e., the host) continuously keeps sending packets to a switch, the switch can continue to flood Packet_IN packets to the SDN controller. If the host is malicious, or if an attacker takes control of the host, the host or attacker can continue to send dummy requests, to the SDN controller through the switch, for 'path setup'. This can overwhelm the SDN controller with the path setup requests, and flood channels between the switch and the SDN controller; thereby preventing the legitimate path setup requests from reaching the SDN controller.

A potential hacker can exploit the table-miss entry in the flow tables and generate an enormous amount of malicious flows from multiple bots to request the SDN controller for path setup. The malicious flows could exhaust the ability of the SDN controller to service the legitimate path setup requests and cause service disruption. Consider that there is a dedicated denial of service attack (or data-to-control plane saturation attack), which overloads the infrastructure of SDN networks. The attacker can generate a large number of anomalous packets, in which all or part of the header fields of each packet are spoofed as random values. These packets can trigger table-misses and compel the switches to send Packet_IN messages to the SDN controller. As a result, this attack will overload the buffer memory of network devices, generate amplified traffic to occupy the data-to-control plane bandwidth, and consume the computation resource of the SDN controller within a short period.

The SDN technology is likely to be adopted in wired and wireless communication networks, 5G networks, 5G advanced networks, 6G networks, and so on, as SDN technology provides a unique centralized control and management plane design, and ability to manage the forwarding devices (such as switches, routers, and so on). With centralized network management architecture of SDN, the protection of the SDN controller from attacks will be necessary. This will allow for smooth adoption of the SDN technology. Existing solutions dealing with the protection of the SDN controller are dependent on Machine Learning (ML) based approaches. The flow (of packets) at the switch that is corresponding to a Packet_IN can be detected by utilization of reverse neural network classifiers. However, utilization of for training and classification can add an additional overhead.

The above information is presented as background information only to assist with an understanding of the disclosure. No determination has been made, and no assertion is made, as to whether any of the above might be applicable as prior art with regard to the disclosure.

OBJECTS

Aspects of the disclosure are to address at least the above-mentioned problems and/or disadvantages and to provide at least the advantages described below. Accordingly, an aspect of the disclosure is to provide methods and systems for providing an efficient, lightweight, and protocol-independent mechanism to mitigate denial of service attacks on a Software-Defined Networking (SDN) controller; wherein the mechanism is based on creation tables in networking devices, such as routers and switches, for storing particulars of data packets that do not match any of the flow entries of the flow tables in the networking devices, wherein the tables allow the SDN controller to control the ingress of data packets at the SDN controller from the networking devices.

Another aspect of the disclosure is to create a table in a networking device for storing table-miss flow entries with lowest priorities, and install flood prevention flow entries in the table, wherein the table-miss flow entries and the flood prevention flow entries correspond to flows for which path setup is incomplete.

Another aspect of the disclosure is to prevent the networking devices from sending Packet_IN messages to the SDN controller corresponding to the flows by enabling the networking devices to refer to the flood prevention flow entries and perform an action, based on the flood prevention flow entries, of refrainment from sending Packet_IN messages to the SDN controller till the path setup for the flows is completed by the SDN controller.

Another aspect of the disclosure is to delete the flood prevention flow entries in the table if the path setup for the flows is completed by the SDN controller, and to continue to drop packets corresponding to the flows at the networking devices if the path setup for the flows ends in failure.

Another aspect of the disclosure is to install the flood prevention flow entries in the table if buffer utilization of one or more ports of the SDN controller is greater than a predefined utilization threshold.

Another aspect of the disclosure is to install the flood prevention flow entries in the table if number of dropped packets corresponding to the flows exceeds a predefined threshold drop rate, wherein the packets corresponding to the flows are stored in queues in the networking devices, and dropped if rate of arrival of packets corresponding to the flows exceeds a predefined threshold rate of packet arrival.

Additional aspects will be set forth in part in the description which follows and, in part, will be apparent from the description, or may be learned by practice of the presented embodiments.

SUMMARY

In accordance with an aspect of the disclosure, methods and systems for securing Software-Defined Networking (SDN) networks from denial of service attacks or data-to-control plane saturation attacks are provided. The methods and systems include receiving data packets pertaining to a flow from a host, a user device, or a server, checking whether header fields of the received data packets of the flow is matching a flow entry in a first flow table of the switch, if it is determined that the flow does not match any flow entry in a first flow table of the switch, configuring a table-miss flow entry pertaining to the flow in a second flow table of the switch, sending the headers of the data packets pertaining to the flow in Packet_IN messages to a SDN controller. The inclusion of the table-miss flow entry in the second flow table of the switch allows sending the Packet_IN messages to the SDN controller. The SDN controller, on receiving the Packet_IN messages, installs of a flood prevention flow entry in the second flow table. The flood prevention flow entry enables the switch to drop subsequent data packets pertaining to the flow till the SDN controller installs a flow entry, matching the flow, in the first flow table of the switch.

In accordance with another aspect of the disclosure, a flood prevention flow entry is provided. The flood prevention flow entry includes at least one parameter included in the header fields of the data packets (such as source Internet Protocol (IP) address, source Media Access Control (MAC) address, destination IP address, destination MAC address, and so on), and an action to be performed by the switch if data packets pertaining to the flow is received. In an embodiment, the action comprises dropping the subsequent data packets pertaining to the flow, if one or more header fields of any subsequent data packets pertaining to the flow match the flood prevention flow entry. This action causes the switch to refrain from sending further Packet_IN messages to the SDN controller till a path setup for the flow is completed at the SDN controller. Thus, attempts to overwhelm the SDN controller by causing the switch to repeatedly send further Packet_IN messages to the SDN controller, and consume the resources of the SDN controller, by initiating the flow through a malicious host or hacking, can be thwarted.

In an embodiment, the flood prevention flow entry can be deleted from the second flow table on installation of a flow entry in the first flow table of the switch. The header fields of the data packets pertaining to the flow are matching the flow entry installed in the first flow table of the switch. The flow entry matching the header fields of the data packets pertaining to the flow is installed, by the SDN controller, in the first flow table of the switch and one or more first flow tables of corresponding one or more other switches, which constitute a path to the destination device of the data packets pertaining to the flow. The SDN controller can determine the one or more other switches leading the data packets pertaining to the flow to the destination device during path setup, as the SDN controller is aware of the topology of the SDN network.

In an embodiment, the SDN controller installs the flood prevention flow entry in the second flow table if buffer utilization of one or more ports of the SDN controller is greater than a predefined threshold. In this scenario, the switch can keep sending Packet_IN messages to the SDN controller, which includes the header fields of the data packets pertaining to the flow corresponding to the table-miss entry in the second flow table of the switch. The SDN controller may periodically check whether the buffer utilization of the one or more ports has crossed the predefined threshold. Once the SDN controller detects that the buffer utilization of the one or more ports of the SDN controller has crossed the predefined threshold, the SDN controller can install the flood prevention flow entry in the second flow table.

In another embodiment, the SDN controller installs the flood prevention flow entry in the second flow table if number of data packets pertaining to the flow dropped by the switch is greater than a predefined packet drop threshold. In this scenario, the switch may keep track of rate of arrival of the data packets pertaining to the flow. The switch may configure a dedicated queue for storing the data packets pertaining to the flow, which corresponds to the table-miss entry in the second flow table of the switch (the flow does not match any flow entry in the first flow table). If it is detected that the rate of arrival of the data packets pertaining to the flow has exceeded the predefined packet drop threshold, the data packets pertaining to the flow is dropped at the switch. When the number of dropped data packets pertaining to the flow exceeds the predefined packet drop threshold, the SDN controller installs the flood prevention flow entry in the second flow table.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for providing an efficient, lightweight, and protocol-independent mechanism to mitigate denial of service attacks on a Software-Defined Networking (SDN) controller. Embodiments herein secure the SDN controller from denial of service attacks or data-to-control plane saturation attacks. The mechanism is based on creation of a table in networking devices, which can store table-miss entries corresponding to flows that do not match any of the flow entries in the networking devices, and flood prevention flow entries corresponding to those flows. The networking devices can refer to the flood prevention flow entries and refrain from sending Packet_IN messages, corresponding to data packets pertaining to the flows, to the SDN controller, till the SDN controller completes path setup for the flows. This allows controlling the ingress of data packets (Packet_IN messages) of malicious flows at the SDN controller from the networking devices.

Figure 5:
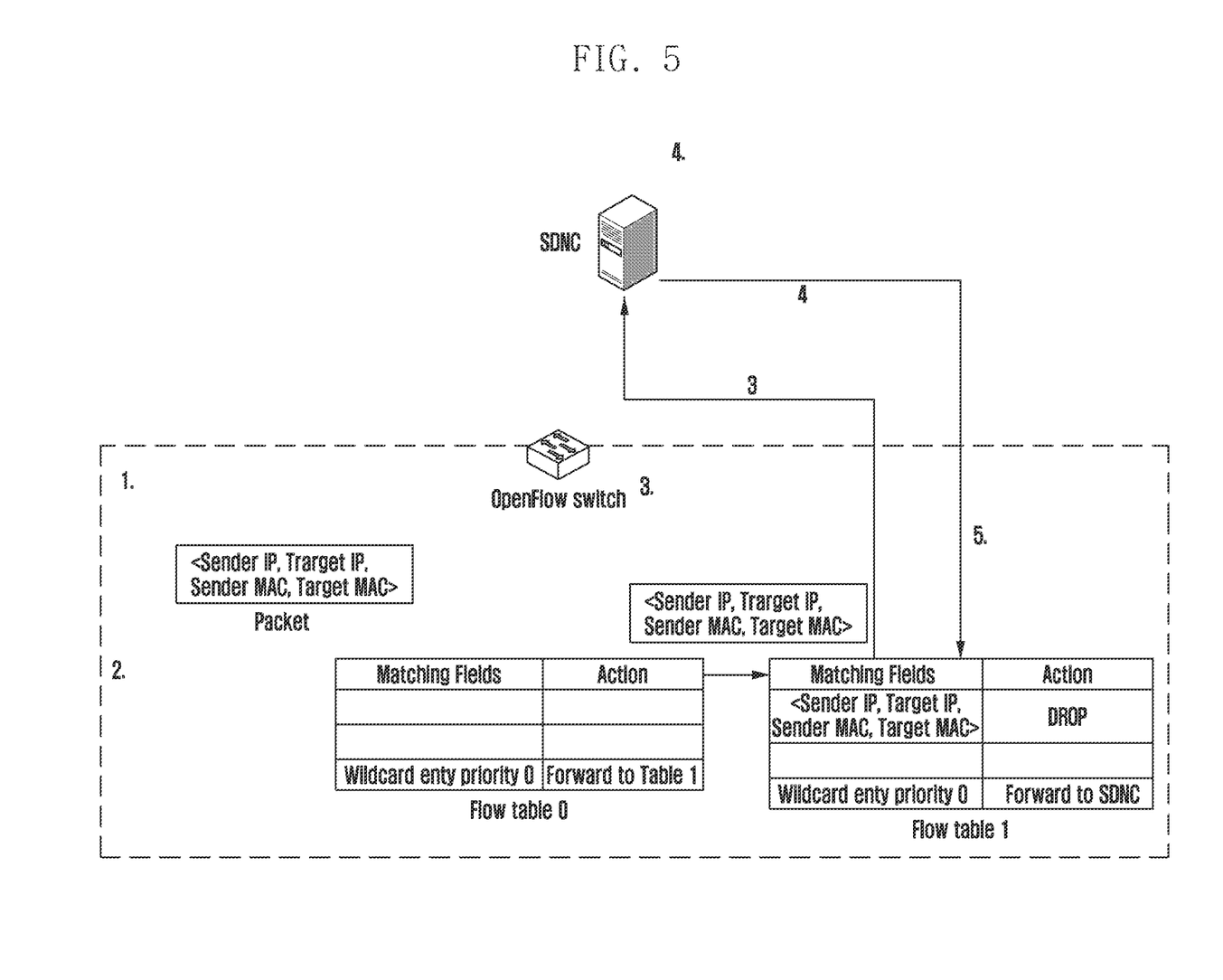
FIG. 5 depicts a flow table design and a mechanism involved in securing a SDN controller from denial of service attacks or data plane-to-control plane saturation attacks, according to an embodiment of the disclosure.
Figure 6:
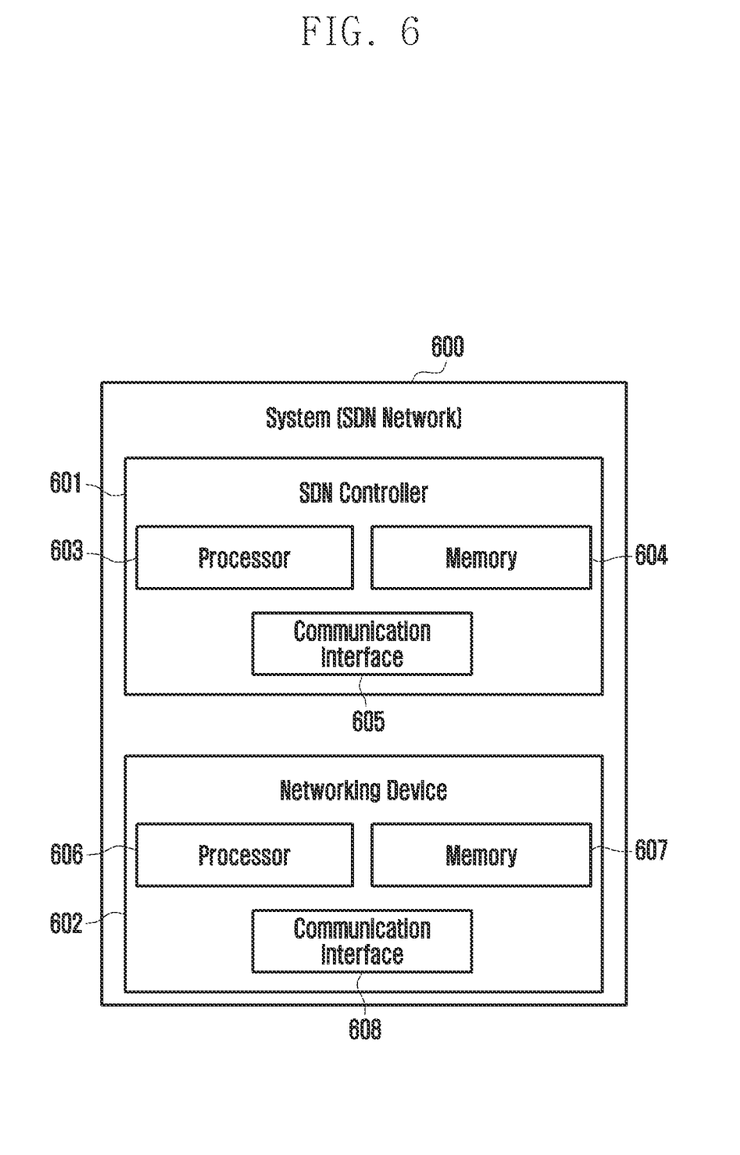
FIG. 6 depicts an example system configured to secure SDN networks from the denial of service attacks or the data-to-control plane saturation attacks, according to an embodiment of the disclosure.h Throughout the drawings, like reference numerals will be understood to refer to like parts, components, and structures.

Referring now to the drawings, and more particularly to FIGS. 5 and 6, where similar reference characters denote corresponding features consistently throughout the figures, there are shown preferred embodiments.

FIG. 5 depicts a flow table design and a mechanism involved in securing a SDN controller from denial of service attacks or data plane-to-control plane saturation attacks, according to an embodiment of the disclosure.

Referring to FIG. 5, an SDN network comprises a SDN controller and a plurality of networking devices such as switches and routers. The networking devices include a flow table for storing flow entries. The flow table can be referred to as table-0. The flow entries can also be referred to as flow rules, and may include matching fields, actions, and statistics. The matching fields comprises particulars that can be included in the header fields of data packets received from hosts, user devices, servers, and so on. The networking devices can match parameters included in the header fields of received data packets of a flow with the particulars in the matching fields. If a match is found, an action can be undertaken on the received data packets of the flow. The action includes dropping the data packets, forwarding or routing the packets to other networking devices, send the header fields of the data packets to the SDN controller, and so on. The statistics include information about the actions performed on the data packets with respect to identification of the flow and the data packets associated with the flow.

Referring to FIG. 5, consider that the networking device is an OpenFlow switch (switch). The embodiments disclosed herein allow configuration of a flow table-1 in the switch. If one or more header fields of the data packets of the flow do not match any matching fields of the flow entries of table-0, then a table-miss flow entry can be configured in table-0. The flow entries can be matched in an order based on priorities allocated to the flow entries. The table-miss flow entry has a priority of 0. Once the table-miss flow entry is configured in table-0, the table-miss flow entry can be configured (or forwarded) in table-1. The table-1 can be utilized for blocking incoming (data) flows from flooding the SDN controller with redundant the PACKET_IN messages.

The flow entries in table-0 can store normal forwarding rules for ongoing data packet streams (flows). Table-1 is utilized for handling the newly arrived flows, requesting for path setup. The newly arrived flows do not match with any flow entries in table-0. Therefore, table-miss entries are created in table-1 (and table-0) corresponding to the newly arrived flows. The table-miss entries created in table-1 enable the networking devices to send Packet_IN messages to the SDN controller. The networking devices send the Packet_IN messages to request the SDN controller for path setup for the newly arrived flows. The Packet_IN messages include one or more particulars of the header fields of data packets of the newly arrived flows. The SDN controller determines paths, comprising of one or more networking devices of the SDN network, through which the data packets of the newly arrived flows need to be routed.

At operation 1, when a flow arrives at a networking device from a host, the networking device checks whether the flow matches any flow entry present in table-0. If the flow does not match any flow entry present in table-0, a table-miss flow entry can be configured in table-0 and the flow can be forwarded to table-1 at operation 2. Thereafter, a table-miss flow entry may be configured in table-1 with priority 0. The networking device can send a PACKET_IN message to the SDN controller at operation 3. On arrival of the PACKET_IN message, the SDN controller may extract the particulars of the header fields of data packets of the flow at operation 4. The particulars of the header fields of the data packets comprises source Media Access Control (MAC) address, source Internet Protocol (IP) address, target MAC address, and target IP address.

At operation 5, the SDN controller may install a flood prevention flow entry in table-1 with priority higher than 0, and a (idle/hard) timeout. The SDN controller may install the flood prevention flow entry for identifying whether header fields of data packets included in the subsequent PACKET_IN messages belong to the same flow. If it is determined that the subsequent PACKET_IN messages include header fields of data packets belonging to the same flow, then the networking device may drop those data packets by referring to the flood prevention flow entry in table-1. The networking device may continue to drop data packets belonging to the same flow, until path setup for the flow is completed. The path setup is performed by the SDN controller, and involves determining one or more networking devices through which the data packets belonging to the flow needs to be routed to, in order to enable the data packets of the flow to reach the destination device (the destination address is included in the header fields of the data packets). Once the path setup is complete, the SDN controller may install a flow entry in table-0 of the networking device, and one or more networking devices.

The flood prevention flow entry may be automatically deleted from table-1 once the flow entry is installed in table-0. The flood prevention flow entry can also be manually removed from table-1 by the SDN controller. Once the flow entry is installed in table-0, the flood prevention flow entry will not be referred. This is because, the path setup for the flow is complete and the data packets belonging to the flow match the flow entry installed in table-0. If the flood prevention flow entry is not referred for a predefined time period, the (idle/hard) timeout occurs, causing the deletion of the flood prevention flow entry from table-1.

According to an embodiment of the disclosure, the SDN controller may not install the flood protection entry in table 1, after receiving a first Packet_IN message corresponding to a flow that does not match any flow entry in table-0. The SDN controller stores Packet_IN messages corresponding to the flow in a buffer of a port in the SDN controller. The buffer utilization of the SDN controller port storing the Packet_IN messages may be periodically checked. If the utilization is less than a predefined threshold, the SDN controller may not install the flood protection entry in table 1. If the buffer utilization of the SDN controller port crosses predefined threshold utilization, then the SDN controller installs the flood protection entry for every incoming flow based on the PACKET_IN fields.

According to an embodiment of the disclosure, queues may be utilized at the networking devices. In each networking device of a SDN network, a dedicated queue on a port can be assigned for processing packets of newly arrived flows (not matching any flow entry in table-0) by mapping corresponding table-miss entries in table-1 with the queues with a predefined data rate. A Set-Queue action may set a queue ID that will be used for mapping a flow entry to a queue on a port. The port can be connected to the SDN controller. If data rates at the queues increase due to an overwhelming amount of traffic (comprising data packets) generated by the malicious hosts, the networking devices may drop the data packets at the queue. The SDN controller may collect queue statistics of the networking devices for obtaining information about number of data packets dropped at the queues by the networking devices. If the number of data packets exceeds a packet drop threshold, then the SDN controller may install the flood prevention entry for every incoming flow based on the header fields of the packets belonging to every incoming flow (included in the received PACKET_IN messages.

FIG. 6 depicts an example system configured to secure SDN networks from the denial of service attacks or the data-to-control plane saturation attacks, according to an embodiment of the disclosure.

Referring to FIG. 6, the system 600 includes a SDN controller 601 and a plurality of networking devices. For the sake of simplicity a single networking device 602 is indicated. The system 600 can also be referred to as a SDN network. Examples of the networking device 602 include a switch, a router, an access point, and so on. The SDN controller 601 may include a processor 603, a memory 604, and a communication interface 605. The networking device 602 may include a processor 606, a memory 607, and a communication interface 608.

The communication interface 608 of the networking device 602 may receive a packet flow stream (flow) from a host, a user device, or server (not shown). The processor 606 of the networking device 602 may check whether header fields of data packets received in the flow match a flow entry in a first flow table of the networking device 602. The first flow table is stored in the memory 607 of the networking device 602. If the processor 606 determines that the flow does not match any flow entries in the first flow table, a table-miss flow entry pertaining to the flow may be configured in a second flow table of the networking device 602. The second flow table is stored in the memory 607 of the networking device 602.

The networking device 602 may send one or more header fields of the data packets of the flow in Packet_IN messages to the SDN controller 601 through the communication interface 608. The configuration of the table-miss flow entry in the second flow table of the switch allows the processor 606 to send the Packet_IN messages to the SDN controller 601. The SDN controller 601 may receive Packet_IN message packets through the, communication interface 605. Upon receiving a Packet_IN message, the processor 603 of the SDN controller 601 may install a flood prevention flow entry in the second flow table of the networking device 602. The flood prevention flow entry includes one or more header fields of the data packets of the flow that allow the processor 606 of the networking device 602 to identify the flow. The flood prevention flow entry allows the processor 606 of the networking device 602 to drop incoming data packets to the flow until the processor 603 of the SDN controller 601 installs a flow entry, matching the flow, in the first flow table of the networking device 602.

The flood prevention flow entry may include one or more header fields of the data packets (such as source Internet Protocol (IP) address, source Media Access Control (MAC) address, destination IP address, destination MAC address, and so on), and a prescribed action, which needs to be performed by the networking device 602 on receiving data packets pertaining to the flow through the communication interface 608. The prescribed action comprises dropping subsequent data packets pertaining to the flow, if one or more header fields of any subsequent data packets pertaining to the flow match the flood prevention flow entry. The performance of the action results in the networking device 602 refraining from sending further Packet_IN messages to the SDN controller 601 through the communication interface 608. The networking device 602 may refrain from sending Packet_IN messages until the processor 601 of the SDN controller 601 performs path setup for the flow.

Accordingly, the flood prevention flow entry installed in the second flow table of the networking device 602 thwarts attempts of malicious hosts or hackers to overwhelm the SDN controller 601 by causing the networking device 602 to repeatedly send Packet_IN messages, corresponding to different flows, to the SDN controller 601. Each time data packets belonging to a new flow arrive at the networking device 602, a flood prevention flow entry is installed in the second flow table of the networking device. The presence of the flood prevention flow entry causes the data packets of the new flow to be dropped at the networking device 602, until the SDN controller 601 determines that the flow is genuine and configures a path for routing the data packets through the SDN network. Therefore, resources of the SDN controller 601 can be utilized for processing genuine requests for path setup, sent through legitimate Packet_IN messages (including header fields of data packets that belong to legitimate newly received flows).

According to an embodiment of the disclosure, the flood prevention flow entry may be deleted from the second flow table on installation of a flow entry, corresponding to a new flow (a table-miss flow entry for the new flow has been configured in the first flow table and the second flow table), by the SDN controller 601, in the first flow table of the networking device 602. Once the flow entry is installed, the header fields of the data packets pertaining to the flow will match the fields of the flow entry installed in the first flow table of the networking device 602. The flow entry may be installed, by the processor 603 of the SDN controller 601, in the first flow table of the networking device 602 and one or more first flow tables of one or more other networking devices 602, which constitute a path to the destination device of the data packets pertaining to the flow. The SDN controller 601 determines the one or more other networking devices 602 that may lead the data packets pertaining to the flow to the destination device during the path setup, as the SDN controller 601 is aware of the topology of the SDN network.

The processor 603 of the SDN controller 601 may install the flood prevention flow entry in the second flow table of the networking device 602 if buffer utilization of one or more ports of the SDN controller 601 is greater than a predefined utilization threshold. The SDN controller 601 may include one or more ports, which include buffers. The memory 604 of the SDN controller 601 constitutes the buffer space. The processor 606 of the networking device 602 may keep sending Packet_IN messages to the SDN controller 601 through the communication interface 608, which includes header fields of data packets pertaining to new flows. The new flows correspond to table-miss entries configured in the second flow table of the networking device 602. The processor 603 of the SDN controller 601 may periodically check whether the buffer utilization of one or more ports of the SDN controller 601 has crossed the predefined utilization threshold. Once the processor 603 of the SDN controller 601 detects that the buffer utilization of the one or more ports of the SDN controller 601 has crossed the predefined threshold, the SDN controller 601 may install the flood prevention flow entry in the second flow table of the networking device 602.

According to another embodiment of the disclosure, the processor 603 of the SDN controller 601 installs the flood prevention flow entry in the second flow table of the networking device 602 if a number of data packets of a flow dropped by the switch is greater than a predefined packet drop threshold. In this scenario, the processor 606 of the networking device 602 may keep track of rate of arrival of the data packets of the flow. The networking device 602 configures one or more dedicated queues in the memory 607 for storing the data packets pertaining to the flow, which corresponds to a table-miss entry in the second flow table of the switch (the flow does not match any flow entry in the first flow table of the networking device 602). If it is detected, by the processor 606 of the networking device 602, that the rate of arrival of the data packets pertaining to the flow has exceeded the predefined packet drop threshold, the data packets pertaining to the flow are dropped by the networking device 602. When the number of dropped data packets pertaining to the flow exceeds the predefined packet drop threshold, the processor 603 of the SDN controller 601 installs the flood prevention flow entry in the second flow table of the networking device 602.

FIG. 6 shows various units of the system 600, but it is to be understood that other embodiments of the disclosure are not limited thereon. In other embodiments, the system 600 may include less or more number of units. Further, the labels or names of the units of the system 600 are used only for illustrative purpose and does not limit the scope of the disclosure. One or more units can be combined together to perform same or substantially similar function in the system 600.

The embodiments disclosed herein can be implemented through at least one software program running on at least one hardware device and performing network management functions to control the network elements. The network elements shown in FIG. 6 include blocks which can be at least one of a hardware device, or a combination of hardware device and software module.

The embodiments disclosed herein describe methods and systems for providing an efficient, lightweight, and protocol-independent mechanism to mitigate denial of service attacks on a SDN controller; wherein the mechanism is based on creation tables in networking devices, such as routers and switches, for storing particulars of data packets that do not match any of the flow entries of the flow tables in the networking devices, wherein the tables allow the SDN controller to control the ingress of data packets at the SDN controller from the networking devices. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the disclosure may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing data flows in a Software-Defined Networking (SDN) network, the method comprising:
   sending, by a networking device, data packets pertaining to a flow to a SDN controller, upon determining that the flow does not match any flow entry included in a first flow table of the networking device; and
   receiving, by the networking device, a flow configuration from the SDN controller,
   wherein the flow configuration causes installation of a flooding prevention entry in a second flow table of the networking device based on the network device transmitting a message to the SDN controller, the message comprising one or more header fields of the data packets, the message being free of a payload portion of the data packets, and
   wherein the flooding prevention entry enables the networking device to drop subsequent data packets pertaining to the flow until a flow entry matching the flow is installed in the first flow table of the networking device.

2. The method of claim 1,
   wherein a table miss flow entry pertaining to the flow is configured in the second flow table after sending the data packets pertaining to the flow to the SDN controller, and
   wherein a table miss flow entry pertaining to the flow is configured in the first flow table prior to configuring the table miss flow entry pertaining to the flow in the second flow table.

3. The method of claim 1,
wherein the flooding prevention entry comprises at least one parameter included in header fields of the data packets, and an action, and
wherein the action comprises dropping the subsequent data packets pertaining to the flow, in case that the flow matches the flooding prevention entry.

4. The method, of claim 1, wherein the method further comprises:
deleting the flooding prevention entry from the second flow table upon installation of the flow entry matching the flow in the first flow table of the networking device and at least one first flow table of at least one other networking device,
wherein the networking device and the at least one other networking device constitute a path to a destination device of the data packets pertaining to the flow.

5. The method of claim 1,
wherein the flow configuration is received in case that a buffer utilization of at least one port of the SDN controller is greater than a predefined threshold, and
wherein a periodic checking is performed to determine whether the buffer utilization of the at least one port of the SDN controller has crossed the predefined threshold.

6. The method of claim 1,
wherein the flow configuration is received in case that a number of dropped data packets pertaining to the flow is greater than a predefined packet drop threshold, and
wherein the data packets pertaining to the flow is dropped in case that rate of arrival of the data packets pertaining to the flow, in a dedicated queue in the networking device, exceeds a predefined data packet arrival rate.

7. The method of claim 6, wherein the dedicated queue in the networking device is configured to store the data packets pertaining to the flow, upon determining that the flow does not match any flow entry in the first flow table.

8. A method for managing data flows in a Software-Defined Networking (SDN) network, the method comprising:
receiving, by an SDN controller, from a networking device, data packets pertaining to a flow, wherein the data packets pertaining to the flow are received case that the flow does not match any flow entry in a first flow table of the networking device and a table miss flow entry pertaining to the flow is configured in a second flow table of the networking device; and
installing, by the SDN controller, a flooding prevention entry in the second flow table of the networking device based on the network device transmitting a message to the SDN controller, the message comprising one or more header fields of the data packets, the message being free of a payload portion of the data packets,
wherein the flooding prevention entry enables the networking device to drop subsequent data packets pertaining to the flow until the SDN controller installs a flow entry in the first flow table of the networking device matching the flow.

9. The method of claim 8,
wherein the flooding prevention entry comprises at least one parameter included in header fields of the data packets, and an action, and
wherein the action comprises dropping the subsequent data packets pertaining to the flow, in case that the flow matches the flooding prevention entry.

10. The method of claim 8, wherein the method further comprises:
installing the flow entry, matching the flow, in the first flow table of the networking device and at least one first flow table in at least one other networking device, wherein the networking device and the at least one other networking device constitute a path to a destination device of the data packets pertaining to the flow,
wherein installation of the flow entry causes deletion of the flooding prevention entry from the second flow table in the networking device.

11. The method of claim 8,
wherein the flooding prevention entry is installed in the second flow table in case that buffer utilization of at least one port of the SDN controller is greater than a predefined threshold, and
wherein the SDN controller periodically checks whether the buffer utilization of the at least one port has crossed the predefined threshold.

12. The method, of claim 8,
wherein the flooding prevention entry is installed in the second flow table in case that number of data packets pertaining to the flow dropped by the networking device is greater than a predefined packet drop threshold,
wherein the data packets pertaining to the flow is dropped in case that rate of arrival of the data packets pertaining to the flow, in a dedicated queue in the networking device, exceeds a predefined data packet arrival rate, and
wherein the dedicated queue in the networking device is configured for storing the data packets pertaining to the flow min case that the flow does not match any flow entry in the first flow table.

13. A method for managing data packet flows at a networking device by a Software-Defined Networking (SDN) controller in a communication network, the method comprising:
receiving, by the networking device, a flow including a plurality of data packets, from one of a host, a user device, and a server;
referring, by the networking device, to a first flow table stored in the networking device, for determining availability of a flow entry associated with the flow;
performing, by the networking device, an action based on the flow entry if the flow entry associated with the flow is available in the first flow table, wherein the action includes one of forwarding the plurality of data packets and dropping the plurality of data packets;
sending, by the networking device, the plurality of data packets to the SDN controller after creating a table miss flow entry pertaining to the flow in a second flow table in the networking device, if the flow entry associated with the flow is not available in the first flow table; and
receiving, by the networking device, a flow configuration from the SDN controller,
wherein the flow configuration causes installation of a flooding prevention entry associated with the flow in the second flow table based on the network device transmitting a message to the SDN controller, the message comprising one or more header fields of the data packets, the message being free of a payload portion of the data packets,
wherein the flooding prevention entry allows dropping the plurality of data packets in the flow until a flow entry matching the flow is installed in the first flow table by the SDN controller, and wherein the flow entry matching the flow includes a path, determined by the SDN controller, to a destination device of the data packets.

14. The method, of claim 13,
wherein the method further comprises removing the flooding prevention entry from the second flow table, and
wherein the flooding prevention entry is removed in at least one condition comprising:
elapsing of a preconfigured time period after installation of the flooding prevention entry in the second flow table, wherein the flooding prevention entry is not used by any flow; and
installing of the flow entry in the first flow table matching the flow.

15. A system for managing data flows in a Software-Defined Networking (SDN) network, the system comprising:
a SDN controller comprising a microprocessor and memory; and
a networking device;
wherein the networking device is configured to send data packets pertaining to a flow to a SDN controller, on determining that the flow does not match any flow entry in a first flow table of the networking device; and
wherein the microprocessor of the SDN controller is configured to install a flooding prevention entry in a second flow table of the networking device to enable the networking device to drop subsequent data packets pertaining to the flow until the SDN controller installs a flow entry in the first flow table of the networking device matching the flow,
wherein the installation of the flooding prevention entry is based on the networking device transmitting a message to the SDN controller, the message comprising one or more header fields of the data packets, the message being free of a payload portion of the data packets.

16. The system of claim 15,
wherein the networking device configures a table miss flow entry pertaining to the flow in the second flow table after sending the data packets pertaining to the flow to the SDN controller, and
wherein the networking device configures a table miss flow entry pertaining to the flow in the first flow table prior to configuring the table miss flow entry pertaining to the flow in the second flow table.

17. The system of claim 15,
wherein the flooding prevention entry comprises at least one parameter included in header fields of the data packets, and an action, and
wherein the action comprises dropping the subsequent data packets pertaining to the flow, in case that the flow matches the flooding prevention entry.

18. The system of claim 15,
wherein the microprocessor of the SDN controller is further configured to install the flow entry, matching the flow, in the first flow table of the networking device and at least one first flow table in at least one other networking device,
wherein the networking device and the at least one other networking device constitute a path to a destination device of the data packets pertaining to the flow, and
wherein installation of the flow entry causes deletion of the flooding prevention entry from the second flow table of the networking device.

19. A method for managing data packet flows in a communication network, the method comprising:
receiving, by a networking device, a plurality of data packets from one of a host, a user device, and a server;
referring to a first flow table, in the networking device, for checking availability of destination addresses of the data packets;
populating the data packets in the first flow table case that the destination addresses are available in the first flow table;
moving data packets whose the destination addresses are not available in the first flow table, to a second flow table;
requesting a Software-Defined Networking (SDN) controller for the destination addresses of the data packets whose destination addresses are not available in the first flow table; and
causing the SDN controller to append a flooding prevention entry to the second flow table subsequent to the request,
wherein installation of the flooding prevention entry is based on the network device transmitting a message to the SDN controller, the message comprising one or more header fields of the data packets, the message being free of a payload portion of the data packets.

20. The method of claim 19, wherein a table miss flow entry is created in the first flow table and the second flow table if the destination addresses are not available in the first flow table,
wherein subsequent data packets, whose destination addresses are not available, are dropped at the networking device until the SDN controller determines the destination addresses of the data packets,
wherein the method further comprises deleting the flooding prevention entry from the second flow table after the SDN controller determines the destination addresses of the data packets,
wherein the networking device comprises a switch, and
wherein the switch stores the first flow table and the second flow table.

* * * * *